Jan. 13, 1942.   K. BRENKERT   2,269,429
WHEEL MOUNTING
Filed Feb. 15, 1941
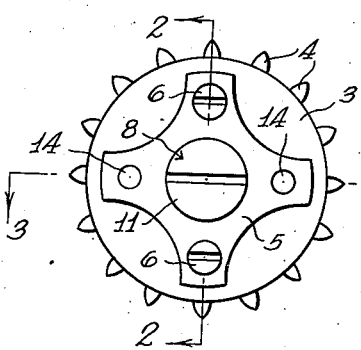
Fig. 1.
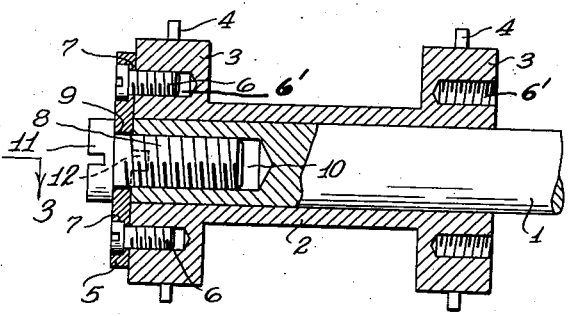
Fig. 2.
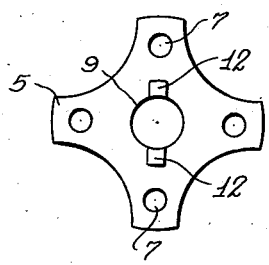
Fig. 4.
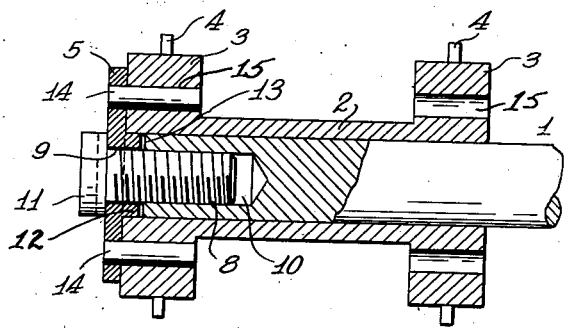
Fig. 3.
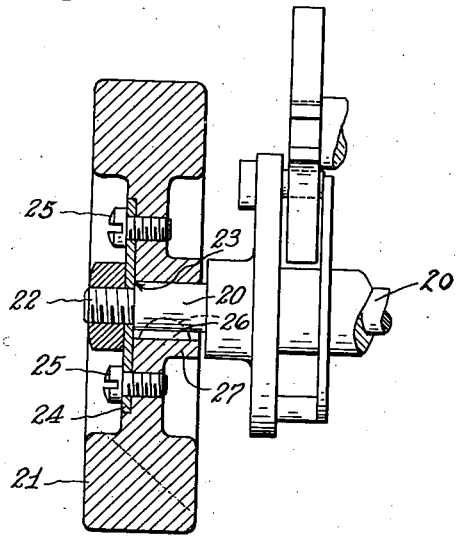
Fig. 7.
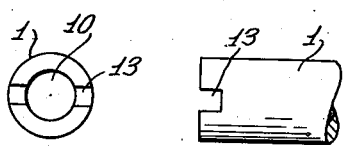
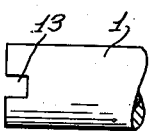
Fig. 5.   Fig. 6.
INVENTOR.
Karl Brenkert
BY Samuel Weisman Patented Jan. 13, 1942

2,269,429

UNITED STATES PATENT OFFICE 2,269,429

WHEEL MOUNTING

Karl Brenkert, Detroit, Mich., assignor to Brenkert Light Projection Company, Detroit, Mich., a corporation of Michigan Application February 15, 1941, Serial No. 379,088

7 Claims. (Cl. 287—53)

This application is a continuation in part of my co-pending application, Serial No. 312,463, filed January 5, 1940. The invention pertains to a novel mounting of the sprocket wheel and flywheel of a motion picture machine, particularly in the intermittent mechanism of a projector.

It is recognized in the art that the sprocket shaft should be finished and aligned within a limit of .0002 or .0003 of an inch, due to the high multiplication of the error in the distance from the projector to the screen. It is exceedingly difficult, if not impossible to observe this limit, because the shaft is liable to be distorted beyond this limit by the stresses set up in the operation of mounting the sprocket on the shaft. In one type of mounting, for example, the sprocket is clamped against a shoulder cut on the shaft. Such a shoulder must be finished with still higher accuracy than that mentioned above, since any error therein is multiplied through the length of the sprocket and causes a substantial tilting of the other end of the sprocket and a corresponding distortion of the shaft. Even if the shoulder is perfect, a particle of dust lodging between the shoulder and the adjacent end of the sprocket is sufficient to distort the shaft beyond the permissible limit. In the assembling operation it is practically impossible to keep the shoulder and the adjacent end of the sprocket free of dirt.

Similar considerations apply to the mounting of the flywheel on the cam shaft of an intermittent movement, inasmuch as this shaft must be given and must maintain a very delicate adjustment with relation to the sprocket or star wheel shaft.

Accordingly, one of the objects of this invention is to provide a wheel mounting that does not require clamping the wheel against a shoulder on the shaft and does not otherwise distort the shaft. In other words, the entire structure for securing the wheel to the shaft is located at one face of the wheel and one end of the shaft and in such a manner as to produce no binding force radially or lengthwise of the shaft. The remaining face of the wheel requires no fastening or binding connection to the shaft.

Another object of the invention is to facilitate replacement or reversal of the sprocket. In present practice it is customary to replace the entire intermittent assembly when the sprocket or shaft requires attention. According to the invention, the sprocket may readily be removed and a new one applied without removing the shaft from the machine. Further, this operation as well as the replacement does not require a skilled mechanic.

In the accomplishment of these objects, the invention involves a retaining plate secured to the free end of the shaft and in turn secured to the wheel. If a headed screw is used to fasten the plate to the shaft, the screw head is sufficient to clamp the plate into driving engagement with the shaft, the plate in turn being fastened to the adjacent face of the wheel. However, it is preferred to provide a positive driving engagement between these parts. The key connection is preferably loose so that it may be coupled without using force on the shaft, and becomes seated during the running of the machine.

Thus, the wheel is removed by merely removing the screws, and is remounted by replacing the screws in the holes provided therefor. By these operations the operator of the machine can quickly reverse a sprocket when the teeth become worn on the driving side.

The invention is fully disclosed by way of example in the following description and in the accompanying drawing in which:

Figure 1 is an end view of a sprocket wheel assembly according to the invention;

Figure 2 is a section on the line 2—2 of Figure 1;

Figure 3 is a similar section in a perpendicular plane;

Figure 4 is an elevation of the inner side of the retaining plate;

Figure 5 is an end view of the sprocket shaft;

Figure 6 is an elevation of the same end; and

Figure 7 is a diametrical section of a flywheel assembly according to the invention.

Reference to these views will now be made by use of like characters which are employed to designate corresponding parts throughout.

The sprocket shaft I is an accurately finished member and accurately mounted in its bearings. The sprocket is of the usual construction comprising a hub 2 with end heads 3 carrying spaced sprocket teeth 4. The sprocket is fitted close on its shaft because side play in the feeding of the film is to be avoided. For the same reason, any springing or distortion of the shaft in the mounting of the sprocket thereon, beyond a very small allowance, is also to be avoided, to which purpose this invention is directed.

It will be seen that the shaft has no abutment engaging the inner end of the sprocket. No stop shoulder, which at best must be very accurately machined, is necessary. A plate 5 is laid across the free end of the shaft and sprocket and secured to the latter by a pair of screws 6. The plate is previously drilled and the sprocket tapped for this purpose, the holes 7 in the plate being preferably countersunk to receive the heads of the screws. Next, a headed screw 8 is passed through a hole 9 in the plate 5 and is screwed into a tapped hole 10 in the free end of the shaft 1.

The clamping action of the screw head 11 is sufficient to hold the plate 5 in driving engagement with the shaft. The plate in turn drives the sprocket through the screws 6. However, extreme tightening of the screw is liable to distort the shaft, and a positive drive between the shaft and the plate is provided, so that the screw need only retain the plate and attached sprocket from shifting lengthwise of the shaft. The driving connection is in the form of a key connection between the shaft and the plate, in this case consisting of key 12 formed on the plate and extending into a slot 13 cut across the free end of the shaft, although this construction may be reversed by forming the key in the shaft and the slot in the plate. The key fits loosely in the slot to avoid distorting the shaft during insertion. Also, if the plate 5 should be tilted due to imperfect surfaces or a particle of foreign matter at the inner surface of the plate, the looseness of the key in the slot will take up the deflection without transmitting it to the shaft. As the machine runs, the key will eventually abut the walls of the slot to form a positive drive.

For economy in construction, dowels 14 may be alternated with the screws 7, there being preferably two screws and two dowels.

It will now be evident that the sprocket is secured to the shaft merely by mounting the plate 5 and inserting the screws 6 and 8 and dowels 14. Since this assembly is disposed entirely at the free or exposed end of the shaft and sprocket, the sprocket can be removed without disturbing the shaft. Thus, if a spare sprocket is kept in stock, replacement can be made without interruption.

Frequently the sprocket teeth become worn or notched on the driving side, and it becomes desirable to reverse the sprocket on the shaft. To enable such reversal, both ends of the sprocket are tapped 6' to receive the screws 6 and drilled at 15 from the dowels.

In Figure 7 is shown the shaft 20 for the cam comprised in the intermittent mechanism and carrying a flywheel 21 for a purpose already recognized in the art. A screw 22 extends from the end of the shaft, but the shaft proper terminates at the square shoulder 23, the screw 22 being merely the equivalent of the screw 8 in the preceding figures, as will presently appear.

A plate 24 is mounted in abutting relation against a face of the flywheel and is secured thereto by screws 25 corresponding to the screws 6. Although the plate 24 surrounds the screw 22, it is of such internal diameter as to abut the end 23 of the shaft 20 in the same manner as the plate 5 in Figures 1 to 4.

The plate is preferably fastened on the flywheel before the latter is mounted on the shaft. The driving connection is obtained in this case by means of a Woodruff key 26 between the shaft and the hub 27 and the flywheel.

The key 12 in Figures 3 and 4, although differing in specific construction from the key 26, nevertheless constitutes a driving means between the shaft and the wheel or may be said to have a driving relation to the wheel.

It will be seen that in both embodiments, the attachment is made entirely at one end of the shaft and one face of the wheel, requiring no further securing devices elsewhere on the shaft and at the other face of the wheel, with the result that no distorting force is applied to the shaft, in keeping with the objects described above.

Although specific embodiments of the invention have been illustrated and described, it will be understood that various alterations in the details of construction may be made without departing from the scope of the invention as indicated by the appended claims.

What I claim is:

1. A shaft and wheel assembly comprising a shaft of uniform diameter, a wheel of uniform bore mounted thereon, means for holding said wheel against rotary and longitudinal movement relatively to said shaft, said means comprising a plate abutting said wheel and an end of said shaft, means for securing said plate to said wheel, means securing said plate to said shaft, and a key extending into said shaft and having a driving relation to said wheel, said two securing means and plate alone being sufficient to hold said wheel against axial displacement.

2. A shaft and wheel assembly comprising a shaft of uniform diameter, a wheel of uniform bore mounted thereon, means for holding said wheel against rotary and longitudinal movement relatively to said shaft, said means comprising a plate abutting said wheel and an end of said shaft, means for securing said plate to said wheel, means clamping said plate against said end of said shaft with a force axial of said shaft, and a key extending into said shaft and having a driving relation to said wheel, said securing means and clamped plate alone being sufficient to hold said wheel against axial displacement.

3. A shaft and wheel assembly comprising a shaft of uniform diameter, a wheel of uniform bore mounted thereon, means for holding said wheel against rotary and longitudinal movement relatively to said shaft, said means comprising a plate abutting said wheel and an end of said shaft, screw means for securing said plate to said wheel, means clamping said plate against said end of said shaft with a force axial of said shaft, and a key extending into said shaft and having a driving relation to said wheel, said securing means and clamped plate alone being sufficient to hold said wheel against axial displacement.

4. A shaft and wheel assembly comprising a shaft of uniform diameter, a wheel of uniform bore mounted thereon, means for holding said wheel against rotary and longitudinal movement relatively to said shaft, said means comprising a plate abutting said wheel and an end of said shaft, means for securing said plate to said wheel, means securing said plate to said shaft, and driving means between said shaft and plate, said two securing means and plate alone being sufficient to hold said wheel against axial displacement.

5. A shaft and wheel assembly comprising a shaft of uniform diameter, a wheel of uniform bore mounted thereon, means for holding said wheel against rotary and longitudinal movement relatively to said shaft, said means comprising a plate abutting said wheel and an end of said shaft, means for securing said plate to said wheel, means securing said plate to said shaft, and a key connection between said shaft and plate, said two securing means and plate alone being sufficient to hold said wheel against axial displacement.

6. A shaft and wheel assembly comprising a shaft of uniform diameter, a wheel of uniform bore mounted thereon, means for holding said wheel against rotary and longitudinal movement relatively to said shaft, said means comprising a plate abutting said wheel and an end of said shaft, means for securing said plate to said wheel, means securing said plate to said shaft, and driving means between said shaft and wheel, said two securing means and plate alone being sufficient to hold said wheel against axial displacement.

7. A shaft and wheel assembly comprising a shaft of uniform diameter, a wheel of uniform bore mounted thereon, means for holding said wheel against rotary and longitudinal movement relatively to said shaft, said means comprising a plate abutting said wheel and an end of said shaft, means for securing said plate to said wheel, means securing said plate to said shaft, and a key connection between said shaft and wheel, said two securing means and plate alone being sufficient to hold said wheel against axial displacement.

KARL BRENKERT.